(12) United States Patent  
Carter

(10) Patent No.: US 6,540,204 B1  
(45) Date of Patent: Apr. 1, 2003

(54) HIGH PRESSURE SOLENOID PILOT VALVE

(75) Inventor: Stephen A. Carter, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 10/031,189

(22) PCT Filed: Jul. 14, 2000

(86) PCT No.: PCT/CA00/00827

§ 371 (c)(1),
(2), (4) Date: Mar. 26, 2002

(87) PCT Pub. No.: WO01/06161

PCT Pub. Date: Jan. 25, 2001

(30) Foreign Application Priority Data

Jul. 14, 1999 (CA) .............................................. 2277602

(51) Int. Cl.$^7$ ............................................. F16K 31/40
(52) U.S. Cl. .................................. 251/30.01; 137/489.5
(58) Field of Search ........................... 251/30.01, 30.02, 251/30.03, 30.04, 30.05; 137/485–492.5

(56) References Cited

U.S. PATENT DOCUMENTS

| 4,305,566 A | * | 12/1981 | Grawunde |  |
| 4,722,361 A | * | 2/1988 | Reip | 137/488 |
| 5,762,087 A | * | 6/1998 | Khadim | 251/30.02 |
| 5,931,186 A | * | 8/1999 | Skoglund | 137/488 |
| 6,161,570 A | * | 12/2000 | McNeely | 137/491 |

* cited by examiner

*Primary Examiner*—Paul J. Hirsch
(74) *Attorney, Agent, or Firm*—Norris Mclaughlin & Marcus, P.A.

(57) ABSTRACT

An improved electrically operated pilot-type, "instant-on" solenoid assembly for near-instantaneous control over the flow of compressed gas. The assembly may be applied in fuel systems for propulsion in vehicles using gaseous fuel. It includes a housing with inlet and outlet passages connected to a primary chamber where a primary piston is slidably mounted, a secondary chamber having a secondary piston slidably mounted within the chamber, a solenoid to produce translational movement of the pilot piston, and passageways linking the various components. When the solenoid is energized, the pilot piston is moved to permit fluid to flow from the primary to the pilot chamber, producing an increase in the differential pressure in the regions of the primary chamber. The differential pressure then forces the primary piston to move, exposing the outlet to fluid flow from the gas inlet.

13 Claims, 5 Drawing Sheets

HIGH PRESSURE SOLENOID PILOT VALVE

FIELD OF THE INVENTION

The invention relates to fuel systems for compressed natural gas fuelled (CNG) vehicles or the like. In particular, the invention relates to a solenoid assembly to control the flow of fuel for a CNG fuelled vehicle or the like.

BACKGROUND OF THE INVENTION

When compressed natural gas (CNG) is used to fuel vehicles, it is stored in thick walled cylinders at pressures as high as 4500 psig. As there is no fuel pump, an electrical solenoid is used to start and stop the flow of CNG from the cylinders to the engine's fuelling system. In order to ensure that the vehicle can be quickly re-fuelled, and that it can operate at low cylinder pressures, such solenoids require large orifices. Orifices of 0.150–0.250" are common. Notably, at 4500 psig, 220 lbs. of force would be required to open a 0.250" orifice solenoid. Such a force is beyond the capability of reasonably sized 12 Vdc direct acting solenoids.

Accordingly, pilot operated solenoids are used. Such solenoids have a direct acting portion (the pilot stage) which opens a small orifice (typically 0.015–0.030" diameter). That small orifice supplies pressure (flow) to the downstream system. Once the pilot flow has nearly equalized the upstream and downstream pressures, a large (primary) stage opens. The primary stage would have the 0.150"–0.250" diameter orifice. Both mechanical and pneumatic means are used to couple the pilot and primary stages. Such schemes require large, expensive solenoid coils, generating a significant amount of heat. Further, they are slow to open the primary stage at low cylinder pressures, causing driver complaints (engine won't accept throttle).

Ideally, such solenoids would open instantly (e.g. in less than 250 milliseconds). Further, they would be installed inside the neck of the thick walled cylinder. Such "internal" installation would protect them from physical abuse (both normally and in crashes) and would also protect them from environmental insult (salt spray, stone toss). However, most current solenoids are too large to fit within the neck of common cylinders. (Note: common cylinders neck openings may be as small as 0.840").

Ideally such solenoids would be able to accommodate the two common flow configurations chosen by vehicle designers. One scheme, Configuration 1, has the solenoid's inlet connected to the gas inside the master cylinder. In that case, the master cylinder is refueled through the solenoid, and its primary piston acts as a back check valve.

In Configuration 2 the solenoid is supplied from an external manifold (fuel rail) which is common to all of the on-board storage cylinders. In that case, even though the solenoid would be installed inside one cylinder (e.g. the master cylinder) its inlet would be isolated from the gas in that cylinder. That is, its inlet would be connected to the external fuel rail. In that case, the master cylinder would not be fueled through the solenoid. Most common solenoids cannot accommodate both of these configurations.

Most common solenoids use rubber orifice seals, which are prone to manufacturing quality problems and to reliability problems in service. When solenoids are placed inside cylinders, the coil leads can be effected by the gas fill blast (high velocity and as cold as −190° F.). Ideally the coil wires would be shielded from the gas blast and/or routed so that the gas blast misses them. Further, many common solenoids place the primary sealing surface such that the fill-gas impinges directly onto the elastomer face. This condition reduces both the life expectancy and the reliability of those solenoids.

SUMMARY OF THE INVENTION

This invention provides an electrically operated, pilot-type, "instant-on" solenoid addressing all of the issues mentioned above. The advantages of this invention include but are not limited to the following:

| | |
|---|---|
| OPERATION: | instant on (e.g. less than 250 m-sec) |
| SIZE: | less than 0.840" in diameter |
| FLOW PATH: | adaptable to Configuration 1 or 2 |
| POWER: | low power continuous duty 12 Vdc coil |
| ORIFICE SEALS: | hard elastomer (e.g. Teflon[PW1], vespel) |
| SEAL LOCATION: | not impinged by fill gas |
| WIRE SHIELDING: | coil wires routed inside solenoid |

This invention is also simple in design and does not require expensive tooling.

In its first form, the invention operates from the gas inside the master cylinder and acts as a re-fuelling check valve. In a second embodiment, the invention is slightly modified to be installed inside a cylinder, while operating from an external fuel rail.

BRIEF DESCRIPTION OF THE DRAWINGS

Embodiments of the invention will be described by way of example and with reference to the drawings in which.

DETAILED DESCRIPTION OF THE PREFERRED EMBODIMENTS

Configuration 1

This invention has a primary and a pilot piston, preferably placed in line with each other. According to one embodiment of the invention, the primary piston has a tight fit to its bore, such that the annular clearance area is preferably equivalent to an orifice of diameter about 0.022". The direct acting pilot opens a pathway for the fluid to the outlet with an effective flow area of typically about 0.030" diameter. The pilot piston connects the "backside" of the primary piston to the outlet port (e.g. low pressure). As a result, as soon as the pilot opens, a large differential pressure appears across the primary piston, forcing it open regardless of inlet pressure. As the 2 pistons are pneumatically coupled, the only coil force needed is that required to open the pilot piston (0.795 lbs for a 0.015" orifice at 4500 psig). Thus, a low power continuous duty coil can be used, for example, a 12 V dc coil. In fact, the long, thin solenoid design provides a very low power density (watts/square inches), ensuring that the solenoid will run cool.

Figure 1:
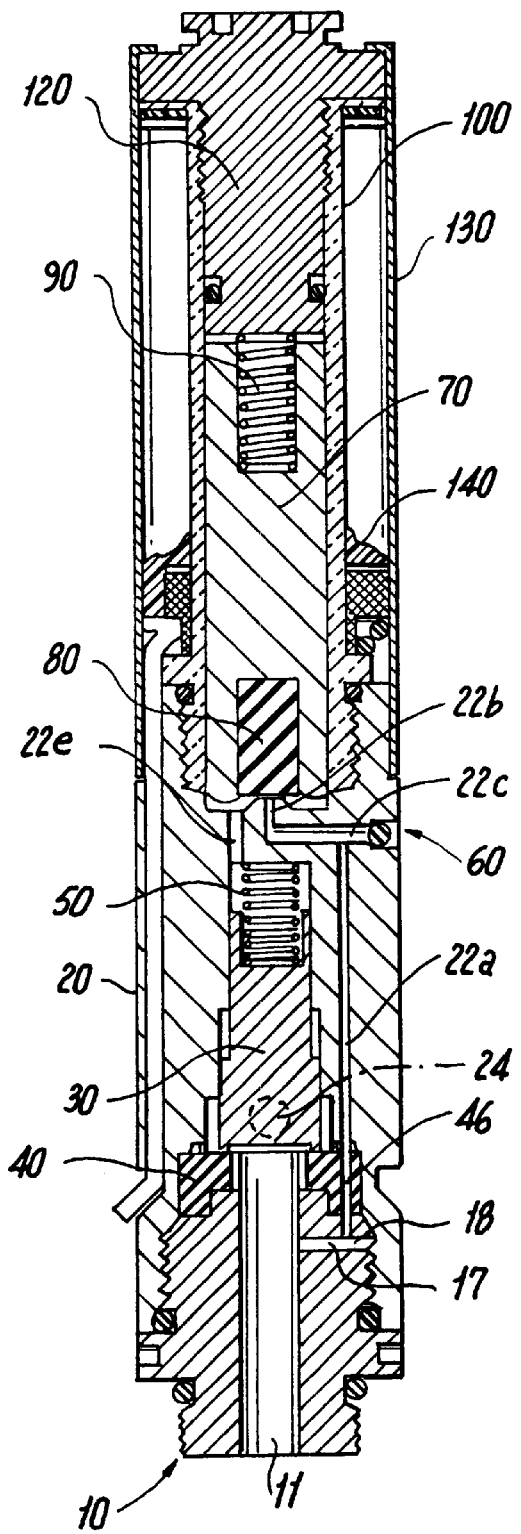
FIG. 1 is a general cross-sectional view of the first embodiment of the invention.

Referring to FIG. 1, the solenoid assembly according to the present invention receives gas from the master cylinder through a series of channels (possibly radially drilled holes) 24 in body 20 (typically about 4–6 holes). If the solenoid is off, as shown, spring 50 acts to move primary piston 30 downwards to its closed (no flow) position. Raised lands on that piston seat against the primary seal 40, providing a gas tight seal. In the off state, spring 90 also acts to move pilot piston 70 downwards to its closed (no flow) position. The pilot seal 80 contained within the pilot piston seals against a raised sealing in body 20, preventing gas flow through the pilot orifice channel 22b. Note that in the off state, the input-output differential pressure acts to help close both pistons.

If the coil windings 140 are energized, pilot piston 70 (made of ferromagnetic material, e.g. magnetic steel) opens. When the pilot piston 70 is open the back side of primary piston 30 is connected to the outlet channel 11 via the following path: a channel 22e, pilot orifice channel 22b, channel 22C, channel 22a, connector channel 46, channel 17, channel 18. The resulting differential pressure across the primary piston 30 forces it to its open position. Channel 22c is sealed via a permanent ball-and-cup type of plug 60. The assembly is connected to a cylinder valve (not part of this invention)) at the end of adapter 10, most typically via threads. A magnetic pole piece 120, a tubular ferromagnetic (e.g. magnetic steel) coil cover 130, and a flux washer 110 complete the coil's flux path.

Figure 2:
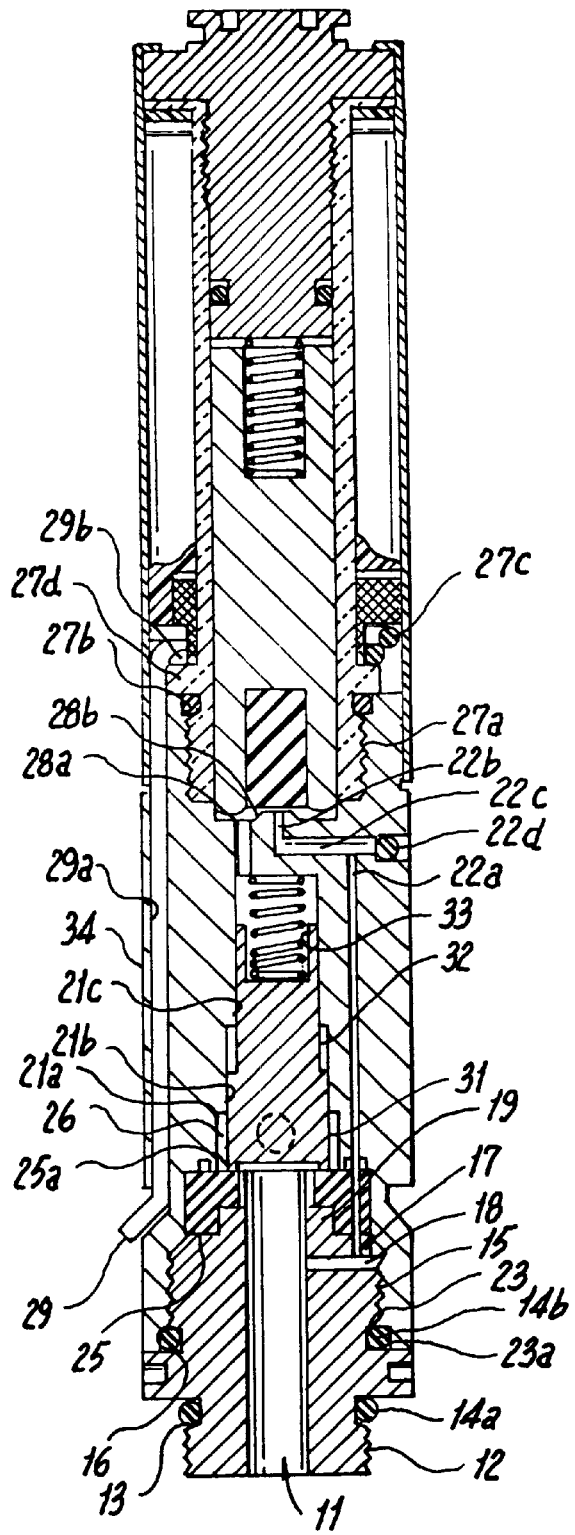
FIG. 2 is another detailed cross-sectional view of the first embodiment of the invention.

Referring now to FIGS. 1 and 2, the assembly is preferably attached to a cylinder valve (not part of this invention) by adapter 10, typically using threads 12 to secure the connection. O-Ring 14a, acting against O-ring gland 13 and a companion gland in the cylinder valve seals the adapter from external leaks. Any gas flow from the solenoid passes outwards from outlet channel 11 and on into the cylinder valve. In this version, threads 15 in adapter 10 mate with threads 23 in body 20, rigidly securing them together. O-ring 14b, acting against glands 16 and 23a, seals adapter 10 to body 20. Channel 18 connects the outlet channel 11 to channel 17. A shoulder on adapter 10 engages a companion shoulder 25 in body 20, providing a positive stop as 10 and 20 are threaded together. Shoulders 19 and 25a provide sealing surfaces for primary seal 40.

Channel 22a intersects annular groove 26 in body 20. This ensures that the "venting gas" from 22a will always connect with the connector channel 46 in seal 40 (see FIG. 1), regardless of how the adapter 10 and body 20 may index as they are tightened. Body 20 preferably contains a 3-step bore (21a-b-c) for primary piston 30. Gas from the master cylinder enters bore area 21a through inlet 24 in body 20 (typically about 4–6 equally spaced holes). The annular area between bore 21a and piston outside diameter 31 is sized to be non-restrictive to flow compared to the downstream through the pilot chamber. Bore section 21b is sized to provide a small clearance with piston outside diameter 32. This small clearance, clearance (typically 0.005") minimizes the possibility of debris migrating into the tight clearance between bore 21c (known as the back section of the primary chamber) and piston outside diameter 32. The clearance between 21c and 32 is small (less than about 0.001"), so that the equivalent flow area through the annular gap will be less than approximately 0.025". For example, if 21c=0.249" and 32=0.250", the annular gap would be equivalent to a 0.022" orifice, which would be thoroughly vented by a 0.035" pilot orifice channel 22b.

Preferably, a spring pocket 33 in piston 30 acts to hold the primary return spring 50. The steps in the bore 21a-21b-21c are preferably selected so that the larger piston diameter 31 seats against the end of bore 21b (a positive stop) before the spring pocket end of the piston hits the end of bore 21c. Bore area 21c is connected to the pilot piston bore 28a via channel 22e, the latter otherwise known as the primary channel (see FIG. 1). When the solenoid is off, the pilot piston seal 80 (FIG. 1) seats preferably against a conventional conical seat 28b, preventing leakage to the outlet. When the coil is energized, pilot piston 70 and seal 80 move to their open position, allowing flow from pilot bore 28a into pilot orifice channel 22b. This vented gas then passes sequentially from channel 22b to channel 22C to channel 22a to connector channel 46 to channel 17 to channel 18 and into outlet channel 11. This pilot chamber vent path (22e-28a-22b-22c-22a-46-17-18-11) causes the outlet pressure to exist at backside of primary piston 30. Since piston 30 has the inlet-outlet pressure differential across its length, that differential pressure forces primary piston 30 to its open position. Channel 22b is sealed from potential leakage by preferably a ball and cup plug 60, which is permanently installed in socket 22d. Potential leakage passes seal 40 is prevented preferably by the circumferential clamping action of the edge of body 20 at 45 (see FIG. 3).

For the solenoid, the coil 140 is preferably wound on core tube 100. The coils termination wires are preferably routed through channel 29a in body 20. The wires enter 29a at an expanded opening 29b and exit at the expanded exit area 29c. Channel 29a is preferably placed midway between the inlet 24 so that the gas blast during refilling cannot impinge on the wires near 29c. The entry point 29b is further protected from gas blast by the bottom edge 132 (see FIG. 3) of coil cover 130. Threads 27a in body 20 mate with threads 102 (FIG. 3) to hold the core tube. O-ring gland 27b and O-ring 27c seal body 20 to core tube 100. Shoulder 27d provides a positive stop for 100 as it is threaded into 20.

During refueling of the gas source, all gas flow patterns are reversed. Gas enters at outlet channel 11, impinges on primary piston 30, forcing it open, The gas then turns and exits through inlet 24 into the cylinder. Notably, the filling gas does not impinge on the primary seal 40. Thus, the refueling process does not reduce its life expectancy.

Figure 3:
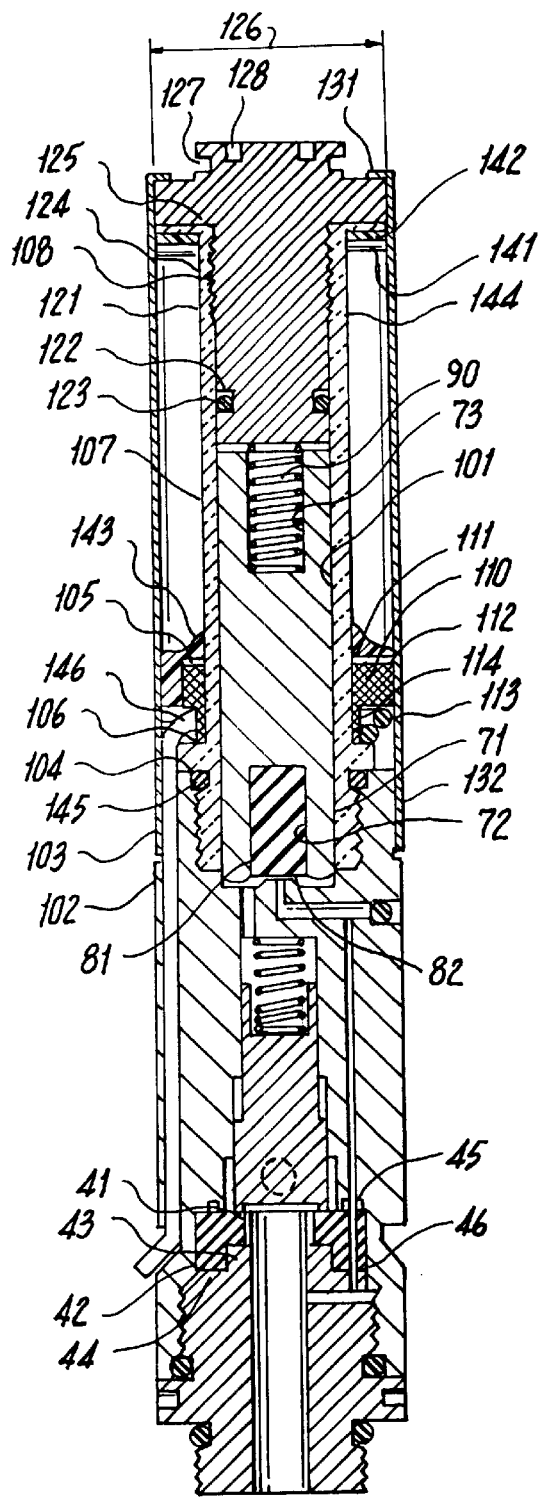
FIG. 3 is a further detailed cross-sectional view of the first embodiment of the invention.

Referring to FIG. 3, the outside diameter 71 of pilot piston 70 rides in the central bore 101 of core tube 100. Due to the low production volumes that are expected for this product, core tube 100 is typically made of brass. A reasonable radial clearance is used (e.g., 0.005") to minimize the air gap while limiting manufacturing expense. A pocket 72 receives the pilot seal 80, which may be secured by a number of known means. The outside diameter 81 of seal 80 is chosen so as be a slight press fit into pocket 72. A typical securing method would use a $^{1}\!/_{16}$" SAE spring pin passed through 70 and 80 at the vertical center of 80 (not shown). The sealing face 82 would be flat and free of burrs or radial scratches so that it forms a good seal against the horizontal face of 28b. A spring pocket 73 provides a location for pilot piston return spring 90.

A gland 103 in core tube 100 acts with o-ring 27b to seal the core 100 to 20. The flat bottom edge 104 both completes the o-ring gland and serves as the positive stop when core tube 100 is threaded into 20. Face 104 terminates at outsider diameter 106, which is chosen so as to leave room to route the coil leads past and into entry area 29b. Otherwise, the outside of the 100 is at outside diameter 107, which is the diameter upon which the coil is wound. A flux washer 110, magnetic steel is installed from the top of 100 and seated against the bottom of outside diameter 107, seating firmly at 105. The inside diameter 111 of flux washer 100 is chosen so as to be a slight press fit onto 107. The outside diameter 112 is chosen to provide a snug fit with the inside diameter of coil cover 130. A pocket 114 is provided in 110 so that the coil termination leads 146 may be routed before cover 130 is installed. This pocket is necessary since the location of coil leads 146 may not match up exactly with the location of the entry area 29*b*. In such case, leads 146 are routed circumferentially in pocket 114 to entry area 29*b*.

Again, to minimize cost, the coil is preferably wound directly onto core tube 100. A plastic insulator 143 is installed over bore 107 and seated against the upper face of flux washer 110. A second similar plastic insulator 142 is installed at the top end of bore 107. A pole piece 120, typically magnetic steel, is threaded into 100 until its shoulder 125 provides a positive stop. Insulator 142 is then moved upwards to seat against 120. A layer of insulating tape 144 is wrapped over outer diameter 107 and magnet wire 141 is then applied. A nominal design would have 10 layers of 28 awg copper magnet wire, comprising 1030 turns and 11 ohms of resistance. Magnet wire 141 would then be attached to plastic insulated copper wire 146.

Pole piece 120 has 2 holes 128 to provide for tightening. Slot 127 provides for an E-type snap ring (not shown) to be installed. Alternatively, both a wave washer and a snap ring could be used. The outside diameter 126 of the pole piece is selected so as to provide a snug fit with cover 130. Coil cover 130 is a ferromagnetic tube typically made of magnetic steel. After cutting the tube to length, one end of the tubing is rolled over, forming lip 131. The E-type snap ring then engages lip 131 to clamp the coil cover in place.

Configuration 2

Figure 4:
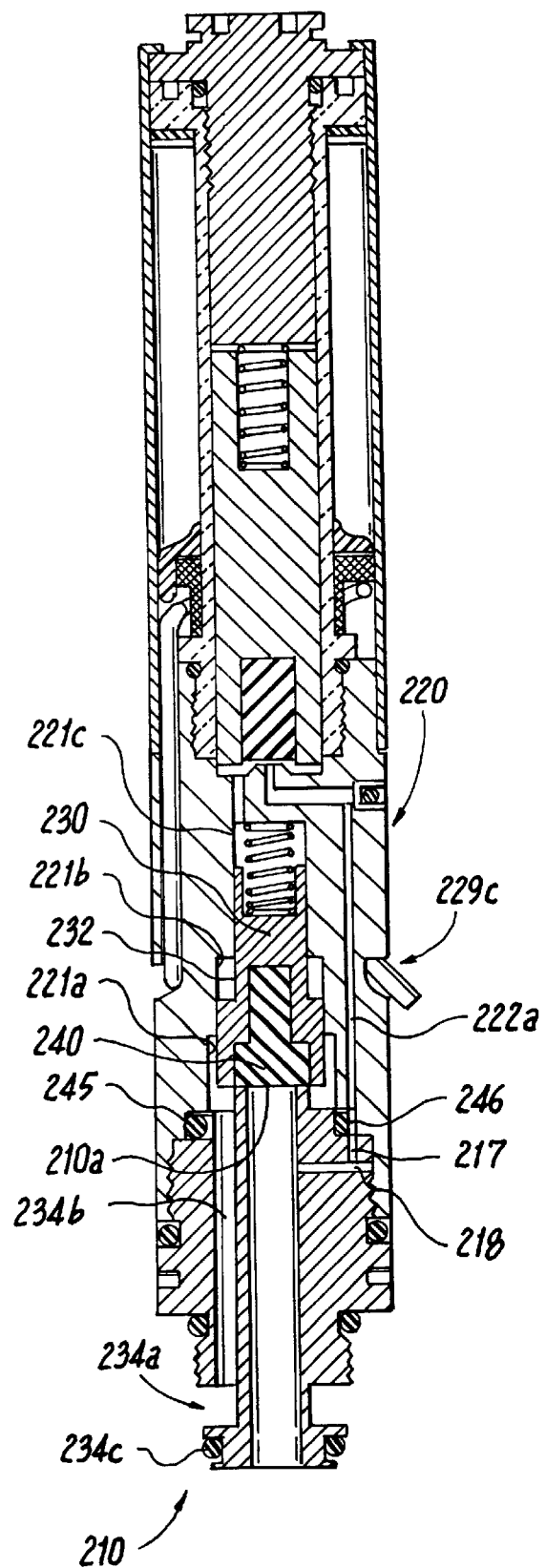
FIG. 4 is a detailed cross-sectional view of the second embodiment of the present invention.

The above design can be adjusted to accommodate the Configuration 2 form described in the Background Section. That is, in this second embodiment, the gas inlet is external, and the master cylinder is not re-filled through the solenoid and the solenoid does not act as a check valve during refueling (see FIG. 4). In this case, the gas inlet and outlet must occur through a single connection. To accomplish this, a side inlet, center outlet configuration is chosen, with o-ring seals separating the inlet and outlet. Specifically, adapter 10 is replaced with adapter 210. Adapter 210 has an annular groove 234*a*, which receives the gas inlet form a port in the side of the cylinder valve's single port. O-ring 234*c* acts to seal body 210 so that the inlet and outlet ports are kept isolated. Groove 234*a* is intersected by several channels 234*b*, which route the inlet gas to the primary piston cavity 221*a*. There would typically be about 5 equally spaced holes 234*b*.

The primary orifice seal function of seal 40 would be replaced by seal 240, which is preferably moved into the primary piston. An appropriate sealing face 210*a* would be machined onto 210, against which 240 would seal. Primary piston 30 would be replaced by piston 230, which is modified to hold seal 240. The seal could be held in place by a variety of known means, with the 1/16" SAE spring pin being the most common choice (not shown). Body 220 replaces body 20, which has only a few differences. In order to accommodate the seal moving into the piston, the outside diameter 231 is slightly larger than outside diameter 31 was. The annular gap between 221*a* and 231 is similarly chosen to be non-restrictive to flow. As before, bore 221*b* is chosen so as to minimize the chance of debris migrating into the tight tolerance area of 221*c*–232. Diameters 221*c* and 232 would be the same as 21*c* and 32. A new seal 245 would assume the feature where seal 40 seals the vent gas path. Seal 245 is essentially a narrower version of seal 40. A channel 246 in seal 245 communicates the venting gas from 222*a* to channel 217 in body 210. Due to the size of diameter 221*a*, the wire exit point 29*c* must move upwards, becoming 229*c*. Similarly, to accommodate the size of 221*a*, channel 22*a* becomes channel 222*a*, which is positioned at an angle to ensure acceptable wall thickness. The gas outlet channel 11 becomes 211. Otherwise the solenoid for Configuration 2 would be the same as for Configuration 1 in these embodiments.

Piston-ring Embodiments

Figure 5:
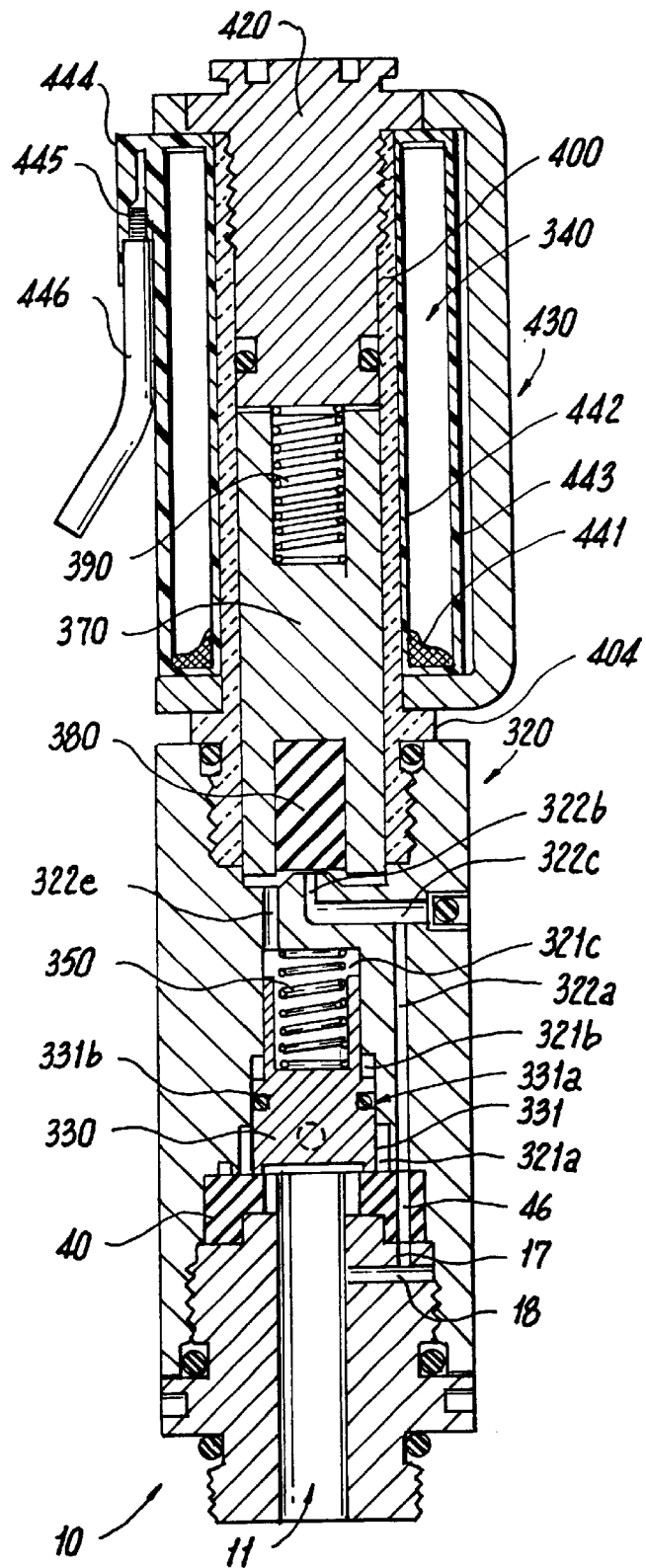
FIG. 5 is a detailed cross-sectional view of the third embodiment of the present invention.

FIG. 5 depicts alternative embodiments of the coil and primary piston parts of this invention. The coil style shown is applicable to cylinders with larger thread neck sizes (for example 2" threads). The alternative primary piston style shown is applicable to any use of this invention and is more tolerant of dirt and extreme temperatures.

The solenoid valve as shown in FIG. 5 is substantially the same a shown in FIGS. 1, 2 and 3. However, it will be appreciated that the embodiments shown here are equally applicable to the format shown in FIG. 4. However, a 3-step bore may not necessary in this case due to the way the differential pressure is created; a 2-step bore is sufficient.

As shown, the primary piston 330 slides within a central bore 321*b* of body 320. Gas from the cylinder enters bore area 321*b* and if primary piston 330 is open, passes to outlet channel 11 in body 10. If primary piston 330 is closed, as shown, gas flow is prevented by primary piston 330 seating against seal 40.

Primary piston 330 has an outer diameter 331 which slides in bore area 321*b*. These two parts would typically have a relatively large clearance to better tolerate dirt and temperature extremes. The 331 portion of the piston would also have a piston ring gland 331*a*, which would receive a piston ring 331*b*. Ring 331*b* could be of either metallic or plastic construction. In the intended application, the ring may only stroke and pressure cycle 50,000 times in its useful life. Thus wear and strength properties are not major issues. Suitable rings are commercially available or can be readily manufactured. Ring 331*b* would be sized to match bore 321*b*, and would have a small gap in the ring when installed on the piston. The gap would be sized to create the flow restriction needed for the solenoid to open quickly at any input pressure. For example, if the bore (321*b*) was 0.375" and the piston (331*a*) was 0.368", a 16° angular gap between the ring ends would have a flow area equivalent to a 0.015" orifice. Ring gap, ring thickness, ring material (yield strength), and the piston-bore clearance would be chosen to ensure that the ring would not extrude into the clearance gap during opening (e.g. during the brief time when a large differential pressure exists across the ring faces). By adjusting the piston to bore clearance, the invention's tolerance to contamination and to differing coefficients of expansion can be enhanced.

FIG. 5 also depicts the use of a more conventional coil construction method. As shown, a plastic overmolded coil, with strain relieved wire exit is used. Instead of a cylindrical coil cover, a lower cost C-shaped "yoke" is used for the flux return path. While this approach is less costly, it requires slightly more space and is therefore applicable to larger gas cylinder thread sizes.

The coil 440 consists of magnet wire 441 would on a spool shaped bobbin 442. The assembly is overmolded 443 with plastic to provide environmental tolerance. A bulge 444 in the overmolding houses the wire terminations 445 which joins the coil's magnet wire to the leads 446. In order to protect the wires from the gas blast during filling, the leads 446 would be retained to the body 320 by a suitable cable clamp (not shown). That is, they would be held to the body midway between the radial fill/discharge holes. The core tube 420 would be shorter than the core tube 100 from FIG. 1, as the wire routing and part 110 have been eliminated. A shoulder 404 in core tube 400 would be sized based on strength requirements. Pole piece 420 would be somewhat smaller and would be sized to engage a companion hole in flux yoke 430. As shown, pole 420 has a gland to receive an external E-ring (snap ring) to retain the yoke 430. Yoke 430 serves as the flux return path and is made from a suitable magnetic steel or stainless steel. Pilot piston 370, which acts against return spring 390, is shorter so as to match the length of core tube 400.

The operation of the solenoid the same as previously described. If coil 440 is energized, pilot piston 370 overcomes spring 390 and moves upward to its open position. Gas in chambers 321b and 321c is evacuated to the downstream section (e.g. low pressure) via connecting passages 322e-322b-322c-322a-46-17-18-11, also known as the pilot chamber vent path. As the area of the piston ring gap is much smaller than the effective flow area through the pilot chamber vent path, the evacuated pressure cannot be fully replaced. Thus, a large differential pressure exists across ring 331b, forcing piston 331 upward to its open position.

It should be obvious to a person in the art that a 3-step bore is not necessary for the primary chamber due to the way the differential pressure is created; a 2-step bore would be sufficient but a 3-step will also work.

In FIGS. 1 to 5, connector channel 46 is shown drilled through orifice seal 40. In another embodiment of this invention, connector channel 22a can be positioned by bypass orifice seal 40 so as to avoid contact with the hard elastomer orifice seal, and connector channel 46 would not be needed.

In all forms (FIGS. 1 through 5) the pilot and primary pistons (370, 330) are pneumatically coupled. As a result, the position of the primary piston 330 varies with inlet pressure, outlet pressure and flow rate, even though the solenoid is continuously energized. At higher flow rates the primary piston 330 will be held in its fully opened position. At lower flow rates, the primary piston 330 will tend to move to a point between open and shut, acting as a constant pressure drop device. Under no flow conditions, the primary piston will move to its closed position and stay there until flow is again demanded by the downstream system. For example, if the load from spring 350 was 1.1 lbs. when piston 330 is fully-open, and diameter 321b was 0.375", the input output differential pressure would be 9.95 psi. This characteristic is quite acceptable to a gaseous fuel injection system.

Although the above description discusses compressed natural gas for vehicular use, it is obvious to the person versed in the art that the invention is equally useful for the flow control of any pressurized gas.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. A solenoid assembly for regulating the flow of gas from a source of gas to a demand comprising:
   (a) a housing defining a longitudinal axis and a first section and a second section,
   (b) the first section comprising a solenoid, said solenoid comprising a tubular core, a coil for inducing a magnetic field, the coil being wound around said core, and a magnetic pole piece positioned within the core,
   (c) the second section defining a first inlet for fluid communication with the source of gas and further defining an outlet for fluid communication with the demand, the outlet residing in an adapter configured to couple to the demand;
   (d) the second section further defining a primary chamber, the primary chamber having an inner section and an outer section, the outer section being in fluid communication with the source of gas through the first inlet and being in direct fluid communication with the outlet through a primary chamber orifice;
   (e) the second section defining a pilot chamber, the pilot chamber having an inner section and an outer section, and the outer section being in fluid communication with the inner section of the primary chamber through a primary channel;
   (f) the second section further defining a pilot channel communicating fluid between the pilot chamber and the outlet through a pilot chamber vent path, the pilot chamber vent path being defined by the housing;
   (g) a pilot piston slidably operating between an open and a closed position within the pilot chamber, and a primary piston operating between an open and a closed position within the primary chamber, the primary piston having a front side and a back side, the back side proximate the inner section of the primary chamber, and the primary piston stopping fluid flow between the primary chamber and the outlet through the primary chamber orifice when the primary piston is in the closing position,
   (h) the primary piston configured to restrict flow through the cross-sectional annular region between the primary piston and the wall of the primary chamber, wherein the effective cross-sectional area of flow in the said cross-sectional annular region is less than the minimal cross-sectional area in the pilot chamber vent path.

2. The solenoid assembly of claim 1, wherein:
   (a) the pilot piston moves to said pilot open position upon activation of the solenoid, and thereby permitting fluid communication between the primary chamber and the outlet through the primary orifice, and thereby between said first inlet and outlet,
   (b) the pilot piston moves to said pilot closed position upon deactivation of the solenoid, and thereby sealing the flow of fluid into the pilot chamber vent path, and
   (c) the primary piston is disposed within the primary chamber to move to the primary open position upon the pilot piston moving to an open position to permit fluid communication between the first inlet and outlet.

3. The solenoid assembly of claim 2, further comprising a primary biasing element for biasing the primary piston toward the primary closed position.

4. The solenoid assembly of claim 3, further comprising a pilot biasing element for biasing the pilot piston toward the pilot closed position.

5. The solenoid assembly of claim 4, wherein the axis of transational displacement defined by the primary piston is parallel to the axis of translational displacement defined by the secondary piston.

6. The solenoid assembly of claim 5, wherein:
   (a) the housing comprises a primary chamber seal mounted proximate to the outer section of the primary chamber, (b) the primary chamber seal stops the flow of fluid into the outlet from the primary chamber when the primary piston is in the closing position abutting the end of the primary chamber proximate to the outer section, and (c) the primary chamber seal made of material selected from the class of materials known as hard elastomers.

7. The solenoid assembly of claim 6, wherein the primary chamber seal is mounted on the housing facing the front side of the primary piston.

8. The solenoid assembly of claim 6, wherein the primary chamber seal is mounted on the front side of the primary piston.

9. The solenoid assembly of claim 6, wherein:

(a) the pilot piston defining a pilot piston body and a pilot seal mounted at one end of the piston body proximate to the front side of the pilot chamber, (b) wherein the pilot seal closes the flow of fluid from the pilot chamber into the pilot channel when the piston is in the closed position abutting the end of the pilot chamber proximate to the pilot section front end, and (c) wherein the pilot seal is made of a material selected from the class of materials known as hard elastomers.

10. The solenoid assembly of claim 9, wherein:

(a) the outer section of the primary chamber defines a first bore, the inner section defines a concentric second bore of pre-determined diameter of smaller size than the diameter of the first bore, said second bore further being defined by an end surface proximate the backside of the primary piston, (b) the primary piston having a predetermined outer diameter such that the cross-sectional annular region between the primary piston and the wall of the second bore has a cross-sectional area less than the minimum cross-sectional area in the primary channel or the pilot channel vent path, and whereupon upon activation of the solenoid in the presence of fluid flow out of the outlet, the pilot piston moves to the pilot open position and the primary piston is in the closed position such that fluid flows under pressure from the first inlet, through the region between the primary piston and the second bore, through the primary channel to the pilot chamber, and further through the pilot channel vent path, the fluid flowing through the primary channel or the pilot channel vent path slower than through the annular region between the primary piston and the second bore, thereby creating a pressure differential at the backside of the primary piston, the pressure differential causing the primary piston to move to the primary open position so that the first inlet is in fluid communication with the outlet.

11. The solenoid assembly of claim 9, wherein:

(a) the primary piston having a ring gland, the ring gland receiving a piston ring for restricting the flow of fluid between the front and the backside of the primary piston, and (b) the piston ring defining a gap of pre-determined area smaller than the minimal cross-sectional area in the primary channel or the pilot channel vent path.

whereupon activation of the solenoid in the presence of fluid flow out of the outlet, the pilot piston moves to the pilot open position and the primary piston is in the closed position such that fluid flows under pressure from the first inlet, and further through the pilot channel vent path, the fluid flowing through the primary channel or the pilot channel vent path slower than through the gap of the piston ring, thereby creating a pressure differential across the piston ring, the pressure differential causing the primary piston to move to the primary open position so that the first inlet is in direct fluid communication with the outlet.

12. The solenoid assembly of claim 11, wherein the adapter comprises a base member with threading for mounting the solenoid assembly, a holding member with threading for attachment to the housing, and a center cavity defined by the adapter, the cavity being in fluid communication with the outlet through the primary orifice when the primary piston is in the open position.

13. The solenoid assembly of claim 12, wherein the base member is connected to a fuel manifold, wherein the adapter further comprising:

(a) an annular groove defined by the adapter, the groove communicating to the source of gas, and (b) a plurality of channels defining a second inlet, and the channels providing fluid communication between the annular groove and the outer section of the primary chamber.

* * * * *